United States Patent [19]
Lane

[11] Patent Number: 5,820,004
[45] Date of Patent: Oct. 13, 1998

[54] MODULAR, MULTI-PURPOSE CARRYING RACK

[76] Inventor: David Andrew Milo Lane, 1700 E. Main St., Ashland, Oreg. 97520

[21] Appl. No.: 566,462

[22] Filed: Dec. 4, 1995

[51] Int. Cl.⁶ .................... B60R 9/06; B60R 9/10
[52] U.S. Cl. .................... 224/485; 224/521; 224/525; 224/532; 224/924
[58] Field of Search ................... 224/531, 532, 224/525, 485, 484, 924, 521, 524, 526, 527, 529, 530

[56] References Cited

U.S. PATENT DOCUMENTS

| | | | |
|---|---|---|---|
| 4,050,616 | 9/1977 | Mosow | 224/532 |
| 4,061,257 | 12/1977 | St. Clair | 224/532 |
| 4,394,947 | 7/1983 | Tartaglia | 224/531 |
| 5,067,641 | 11/1991 | Johnson et al. | 224/532 |
| 5,094,373 | 3/1992 | Lovci | 224/532 |
| 5,096,102 | 3/1992 | Tolson | 224/532 |
| 5,129,559 | 7/1992 | Holliday | 224/534 |
| 5,232,135 | 8/1993 | Marren | 224/525 |
| 5,460,304 | 10/1995 | Porter et al. | 224/924 |

*Primary Examiner*—Linda J. Sholl

[57] ABSTRACT

A modular, multi-purpose carrying rack which has a number of configurations for carrying a wide variety of objects on a vehicle. The rack is economical, simple to construct, easy to use and can be disassembled and stored in the vehicle trunk. The rack utilized a novel, anti-wobble connector to connect to receiver-type trailer hitches. The rack is comprised of at least one vertical member which can be removably attached to the connector; at least one cross bar which can be slidably attached to the vertical bar; and at least two elongate horizontal members which can be slidably attached to the cross bar(s).

4 Claims, 10 Drawing Sheets

MODULAR, MULTI-PURPOSE CARRYING RACK

This application is based, in part, on material originally described in Disclosure Documents 341760, 351035, 358994, 363761, and 376632, which by reference are incorporated and made of this document.

FIELD OF THE INVENTION

This invent ion relates to a modular, multi purpose carrying rack for carrying a variety of items on a vehicle and a novel means to attach the rack to a receiver-type trailer hitch.

BACKGROUND OF THE INVENTION

There are a variety of luggage racks, ski racks, bike racks and roof top racks on the market, however, all suffer from a number of problems. Roof top racks interfere with the aerodynamics of the vehicle. The racks arc frequently heavy and bulky and difficult to install and so tend to get left in place for long periods of time. Both the added weight and the loss of aerodynamics reduce the gas mileage of the vehicle. Roof racks necessitate that all objects be hoisted high in the air and then awkwardly placed onto or in the rack. This can be difficult, dangerous and can result in personal injury or damage to the vehicle, object and/or the rack. Bike racks which attach to the rear bumper and/or the trunk lid pose similar problems of being inconvenient to attach and possibly scratching the vehicle during installation. In addition, such racks usually prevent access to the trunk, necessitating dismounting both the bikes and the rack to gain access to the trunk.

There are numerous previous patents of car racks which attach to the vehicle bumper, frame or an existing trailer hitch. Racks or carriers, such as U.S. Pat. Nos. 4,813,584, 4,856,686, 4,901,896, 5,038,983, 5,181,822, and 5,232,133 which attach to either a trailer hitch or a trailer hitch ball all suffer from a common problem: the tendency of the rack and the objects carried to rock back and forth due to the nature of the mounting system. Another disadvantage is that most such carriers are single units which are large and bulky, making it difficult for only one person to install. This is especially true of U.S. Pat. No. 5,038,983 which has been dubbed the "Wheelless Trailer".

Most of the designs are single purpose, e.g., bike carriers or variations on platforms or boxes for holding objects. A few claim to be multipurpose, but it is obvious that they are primarily intended for only one purpose. Several are quite complex and therefore would be costly to manufacture. Most do not lend themselves to being carried in the trunk of the vehicle when not in use and therefore they would have to be stored at home and could not be available to be installed away from home.

Totally separate from the racks mentioned above are roof top carriers of many different designs. Permanently installed racks for pickup trucks and for vans are popular with tradesmen for carrying long items such as pipe and lumber. Ski racks, bike racks and both enclosed and open cargo containers are also in evidence in great numbers on the tops of vehicles. All these attest to the need to be able to carry additional items on vehicles. Each type of car top carrier has its own drawbacks. Permanently installed racks allow large items to be carried, but the rack must be left in place when not in use thereby adding to the weight and reducing the aerodynamics of the vehicle, with a resultant decrease in gas mileage. Removable racks are smaller and therefor greatly limit the amount and size of object(s) that can be carried. This is especially true for small cars with small roof areas, such as sports cars. One inventor, McNeece, U.S. Pat. No. 3,902,642 attempted to correct this deficiency by designing a large car top rack which extended from the rear bumper to the front windshield. This design was essentially a single piece which would be costly to manufacture, difficult to store and which would require at least two people to install.

SUMMARY OF THE INVENTION WITH OBJECTS

The subject of the current invention is a modular, multi-purpose carrying rack which will allow a vehicle owner to easily and quickly attach the rack to an existing receiver-type trailer hitch for the purpose of transporting a wide variety of large and bulky items. The rack is constructed out of readily available tubing which requires only simple cutting and welding techniques to produce pieces which slide together to form a horizontal rack which can be positioned at a variety of heights along a vertical pole. The rack can be used either by itself or in conjunction with a folding platform to carry a wide variety of objects at the rear of a vehicle at approximately bumper height. In addition, the rack can be configured to carry bikes and the vertical pole can serve as an attachment point for specialty racks, e.g., a ski rack. Depending on the configuration chosen, this rack can be used as:

- a bicycle rack
- a rack which can be configured in a variety of ways to haul items which can be suspended from horizontal bars, e.g., a wheelchair, a light motorcycle or a scooter,
- a base for attaching a optional ski rack
- a base for a platform for hauling bulky items such as lawn mowers, appliances and furniture;
- a small table top or work bench which can be adjusted to various heights;
- a base for attaching a cargo container, either open or closed, to serve as supplemental trunk space;
- a rack which can coordinate with a roof top rack to easily allow large, long and bulky items to be carried between the roof top rack and this rack at the rear of the vehicle.

The general object of this invention is to provide a modular, multi-purpose carrying rack and a novel means to attach it to a receiver-type trailer hitch that overcomes the limitations and drawbacks of the prior art.

A specific object of the invention is to provide a carrying rack which can be configured in a variety of ways to increase its utility in hauling a variety of items.

Another specific object of the invention is to provide a carrying rack which can be assembled and disassembled easily and stored in the trunk of the vehicle.

Another specific object of the invention is to provide a carrying rack which is easy and inexpensive to construct.

Yet another specific object of the invention is to provide a carrying rack which is easy to attach to the vehicle.

Yet another specific object of the invention is to provide a carrying rack which carries items at the rear of the vehicle so as to reduce wind drag.

Still another specific object of the invention is to provide a means to firmly attach carrying racks to receiver-type trailer hitches to minimize movement between the rack and the receiver.

BRIEF DESCRIPTION OF THE DRAWINGS

FIGS. 12*a* & *b* are plane views of possible mounting methods built-in to the bumper of a vehicle.

In all FIGS. small circles designate points at which nuts and bolts or other suitable fasteners may be used to attach one piece to another.

DESCRIPTION OF PREFERRED EMBODIMENTS

Figure 1:
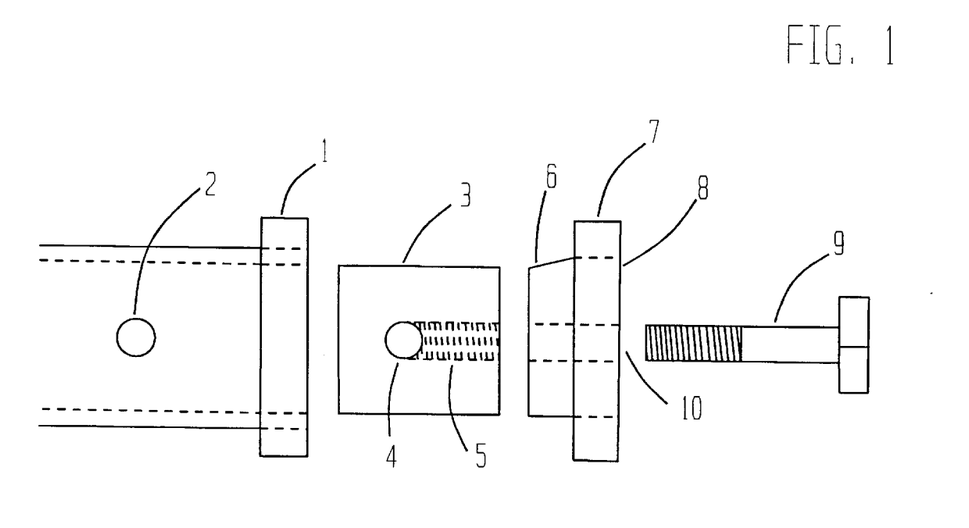
FIG. 1 is an exploded, plane view of the attachment means for a rack or other item.
Figure 2:
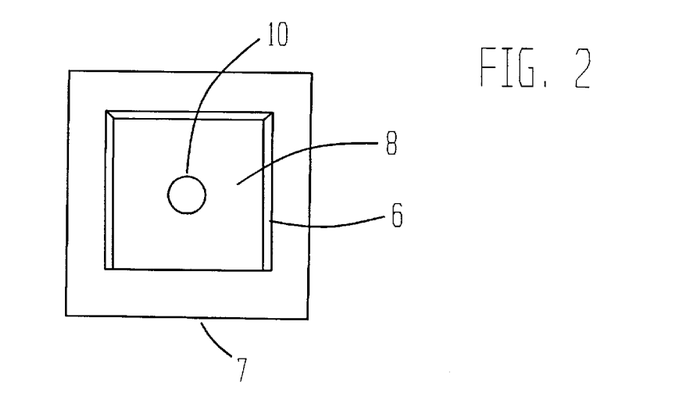
FIG. 2 is a plane view of the left face of part Items 7 & 8.

The modular rack is extremely simple and therefore light weight, inexpensive and easy to use. The connector shown in FIGS. 1, 2, 3 & 4 is very easy to attach to a receiver-type trailer hitch. FIGS. 1 & 2 show a generic mounting system which could be used to securely attach any item to a receiver-type trailer hitch. Item 1 is the receiver portion of a trailer hitch. Item 3, first insertable member, is a square piece of metal just slightly smaller in cross section than the opening in the trailer hitch. With bolt 9 inserted through Hole 10 of Item 8, second insertable member, and partially screwed into Item 3, Item 3 can be inserted into the receiver portion of the trailer hitch until hole No. 4 lines up with hole No. 2. A bolt or suitable pin can then be inserted through both holes and bolt No. 9 can be tightened thus forcing the wedge shaped faces 6 of Item 8 firmly into the square opening of the trailer hitch. Faces 6 of Item 8 can be wedge shaped on one, two, three or all four sides. FIG. 2 shows three faces as wedges with the fourth, bottom face as being flat; this allows the adjoining bottom face of collar 7 to rest firmly against the bottom face of Item 1, thereby reducing a tendency of Item 8 to rotate downward within the opening of the receiver under heavy loads. This method of attachment creates a firm means of attaching an item to a receiver-type trailer hitch with no wobble. Elimination of wobble at this point is important to safely carrying heavy loads.

Figures 3, 4:
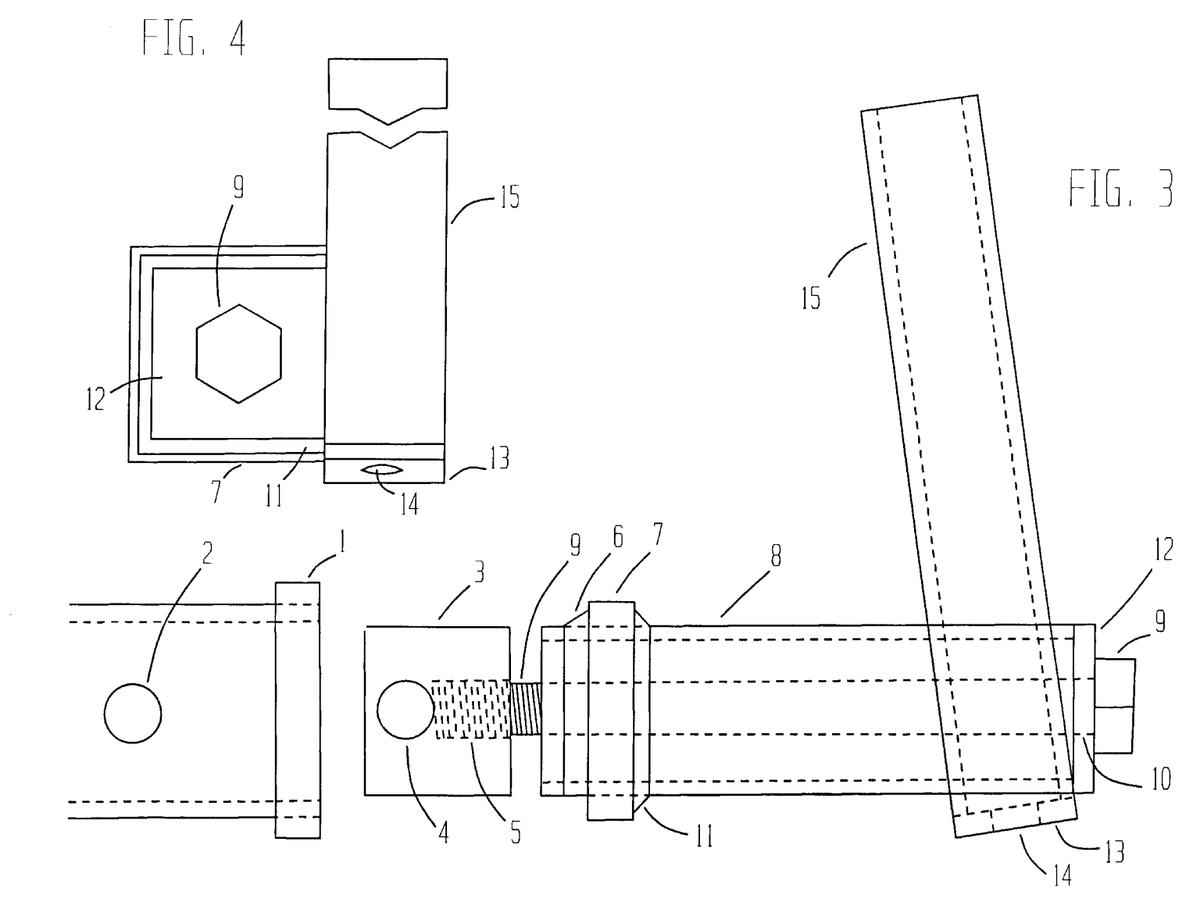
FIG. 3 is a plane view of a variation of FIG. 1 which has been designed specifically for the purpose of attaching the rack portion of this invention to a receiver-type trailer hitch.
FIG. 4 is a plane view of the right face of FIG. 3.

Any portion of Items 7 and 8 could serve as the attachment point for a rack or other object. Item 8 could be elongated, as in FIG. 3 or Item 7 could be enlarged, as needed, and the rack could be attached by any suitable means to either or both items. Likewise, Items 7 and 8 could be molded, forged or machined out of a single piece of metal—they are shown as two distinct pieces only as an example. FIGS. 3 & 4 illustrate a variation of the generic attachment means shown in FIGS. 1 & 2, specifically designed for the current invention. In this version, a hollow, square tube, Item 8 has a collar, Item 7, welded onto it. The weld at 6 is ground into an oblique angle thus creating a three sided wedge similar to faces 6 in FIG. 1. Faces 11 are an additional weld to firmly attach collar 7 to tube 8. Plate 12 provides a shoulder on which bolt 9 can rest. In the current invention, the attachment means, Items 7, 8, 12, 13 & 15, is envisioned as being welded together as a single unit. The approximate 82 degree angle between tubes 8 & 15 allows the horizontal rack to remain essentially horizontal when a heavy load is placed on it—the angle compensates for the lowering of the end of the vehicle. Once this attachment means is in place, it is likely the vehicle owner would leave it connected to the trailer hitch for extended periods of time since it does not interfere with other uses of the vehicle, except towing a trailer. This would allow for easy attachment of the rest of the rack when needed.

Figure 5:
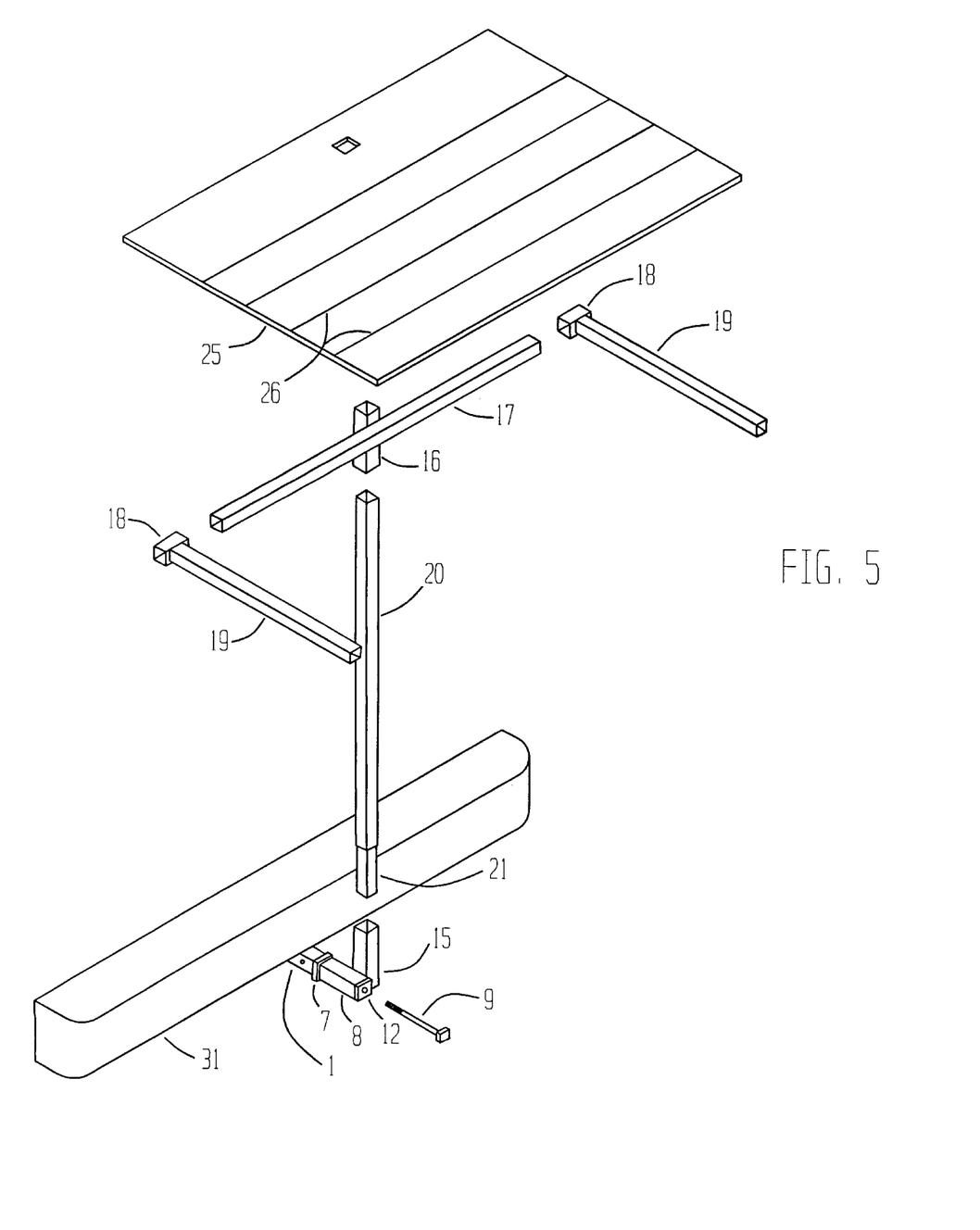
FIG. 5 is a partially exploded isometric view of the entire carrying rack attached to a trailer hitch.
Figure 7:
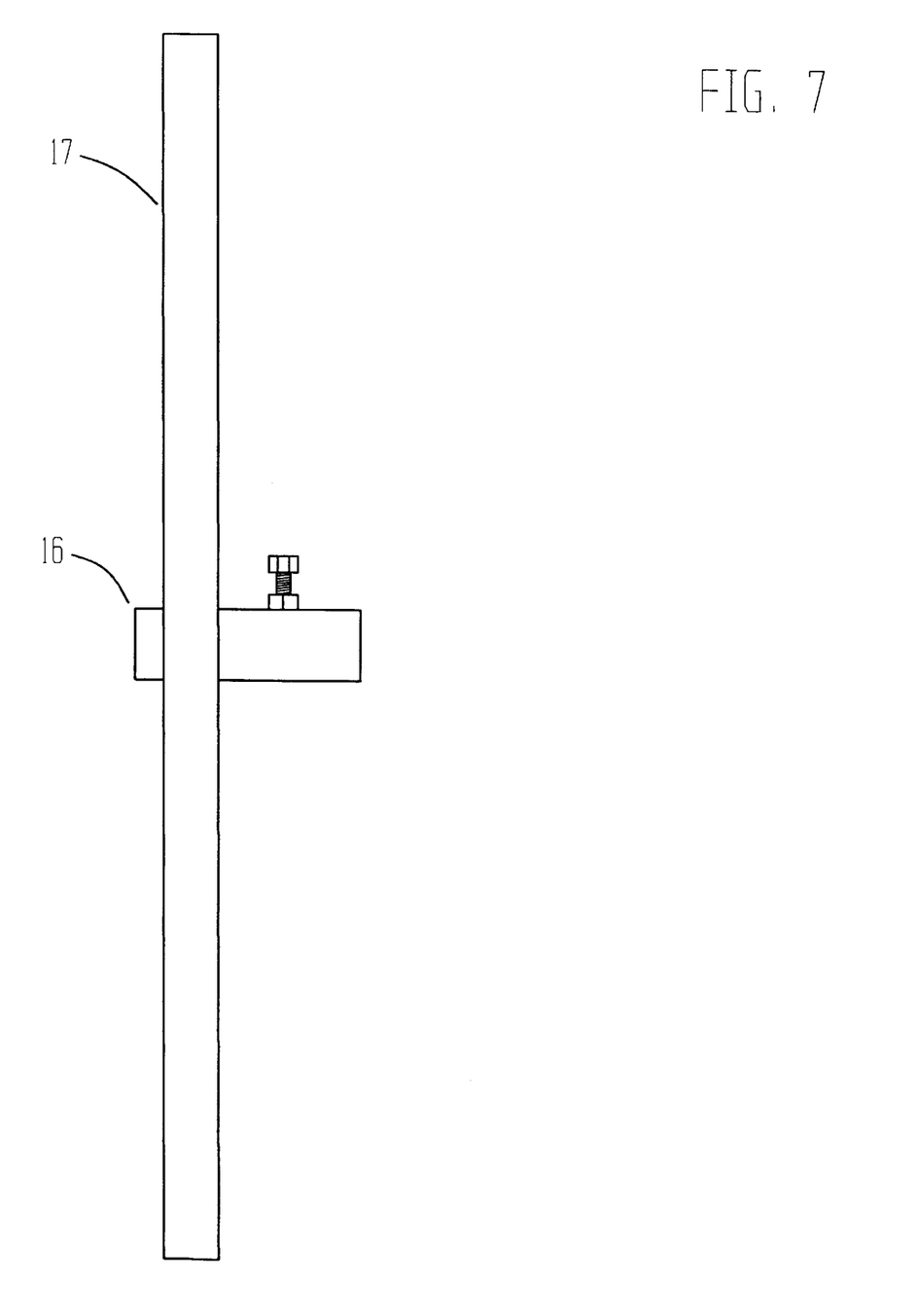
FIG. 7 is a plane view of items 16 and 17.

FIG. 5 shows an exploded view of the rack with the connector attached to a trailer hitch. For reference, Item 31 is the bumper of a vehicle. Tube 16 is solidly welded at right angles to tube 17, and tube 16 slides snugly over either or both tubes 15 & 20 which are both the same cross sectional area. Not shown in FIG. 5 is an attachment means to firmly connect tube 16 to tube 15 or 20, however it is envisioned that a nut would be welded over a hole in the side of tube 16 and a bolt could be inserted into the nut and when tightened, would firmly attach tube 16 to tube 15 or 20; this is illustrated in FIG. 7. Item 18 is a short piece of square tubing which snugly slides over tube 17. Not shown is a means to firmly attach tube 18 to tube 17, however the same system of a nut and bolt mentioned immediately above could be used to allow tube 18 to be firmly attached to tube 17 at any point along the length of tube 17 (see FIG. 8). Using this same attachment means, one or both of tubes 18 could also be attached to tube 20 for special purpose hauling. Tube 19 is welded to tube 18. Item 20 is a vertical tube which may be used with the rack as it is configured in FIG. 5; tube 20 would provide a place to attach ropes or straps to be used to steady and secure large objects. Combined, tubes 17 & 19 can serve as the base for a platform, Item 25 shown here and in FIG. 10, on which to place large objects. This platform could be configured to fold up along hinge lines 26 so it would be easier to handle and store. Instead of a platform, tubes 17 & 19 could alternately serve as the base for a closed or open cargo container, Item 28 in FIG. 11: this would provide an additional 15–25 cu. ft. of "trunk" space for the vehicle, when needed. If the cargo or cargo container obscured the tail lights of the vehicle, the ends of tubes 19 form an ideal place to easily attach supplemental lights (Item 27) as illustrated in FIG. 11. Since tubes 18 can be slid over tube 17 and firmly attached at any point, the spacing between tubes 19 can be varied to accommodate not only bikes, but a variety of other objects, such as a wheelchair or even a light weight motorcycle or scooter. Alternately, a ski rack (not shown) could be attached to tube 20 in the same manner as the bike rack assembly. It is even possible to attach both a ski rack and the bike rack at the same time, using the bike rack for carrying other large winter recreation objects such as a sled or toboggan. If the rack is placed at an appropriate height, the platform can be used as a work area or as a small table.

Figure 6:
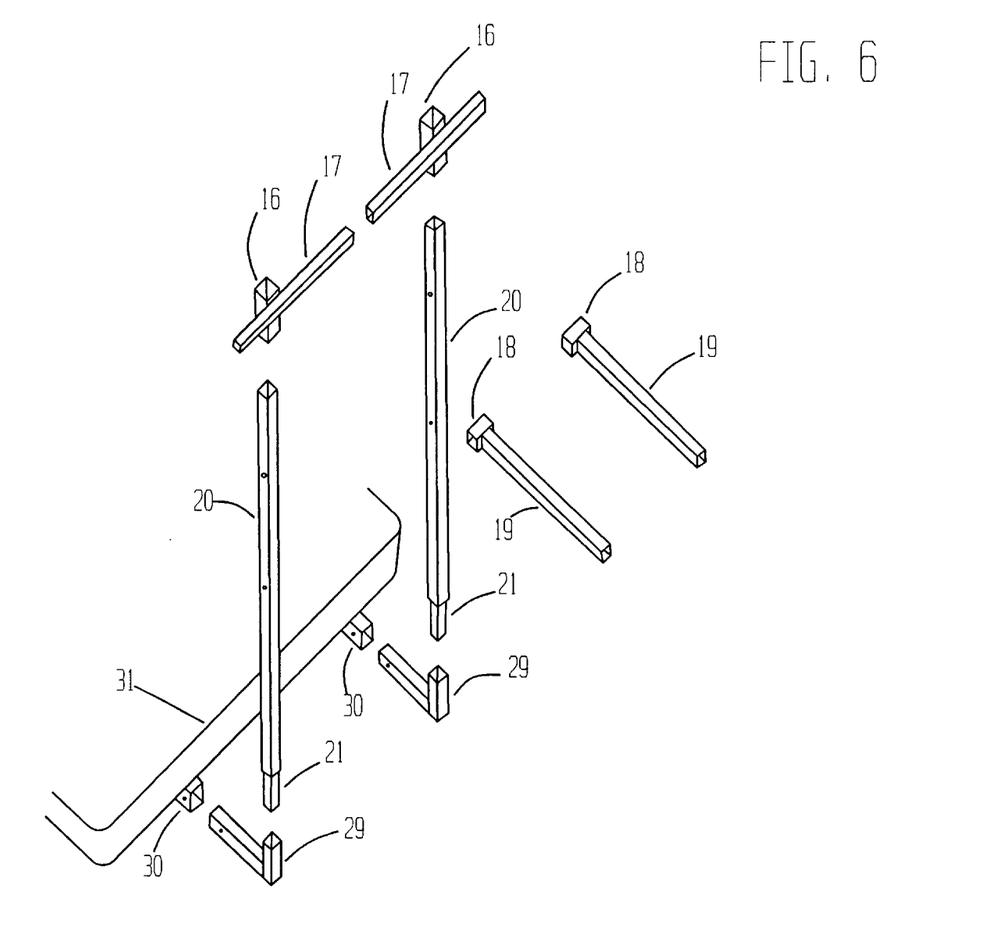
FIG. 6 is an exploded isometric view of an alternate embodiment of the rack utilizing two vertical poles.

FIG. 6 shows an alternate embodiment of the invention utilizing two vertical tubes. Two attachment points would allow the rack to be stronger and carry heavier loads and would reduce the need for the special connector shown in FIGS. 1, 2, 3, & 4 since wobble is more easily controlled with two points of attachment. In this embodiment, two cross bars are required and there must be two attachment points 30 and two connectors 29. Since this would require modification of the vehicle, it is envisioned that this version would be less practical unless manufacturers started building attachment points, similar to Items 30, into vehicles. It is envisioned that the attachment points could also be placed either vertically or horizontally within the vehicle bumper, as in FIGS. 12a & b. If horizontal attachment points were built into the vehicle at the time of manufacture, they could simply have a threaded piece built-in to obviate the need for the first insertable member, Item 3 of the current invention; bolt 9 would screw directly into such a threaded piece (Item 34 of FIG. 12a). If the attachment points were vertically built-in to the bumper, as in FIG. 12b, the vertical tubes 20 & 21 could be slid into tubes 35 and attached as illustrated in FIG. 9 with a bolt at the bottom; in essence, tube 15 of FIG. 3 would be built-in to the bumper.

FIG. 7 illustrates the construction of Items 16 & 17 which are welded together at right angles to form a cross bar. Note the nut welded over a hole on the side of Item 16 and the bolt inserted into it which can be used as a means to firmly attach Item 16 at any height along tube 20.

Figure 8:
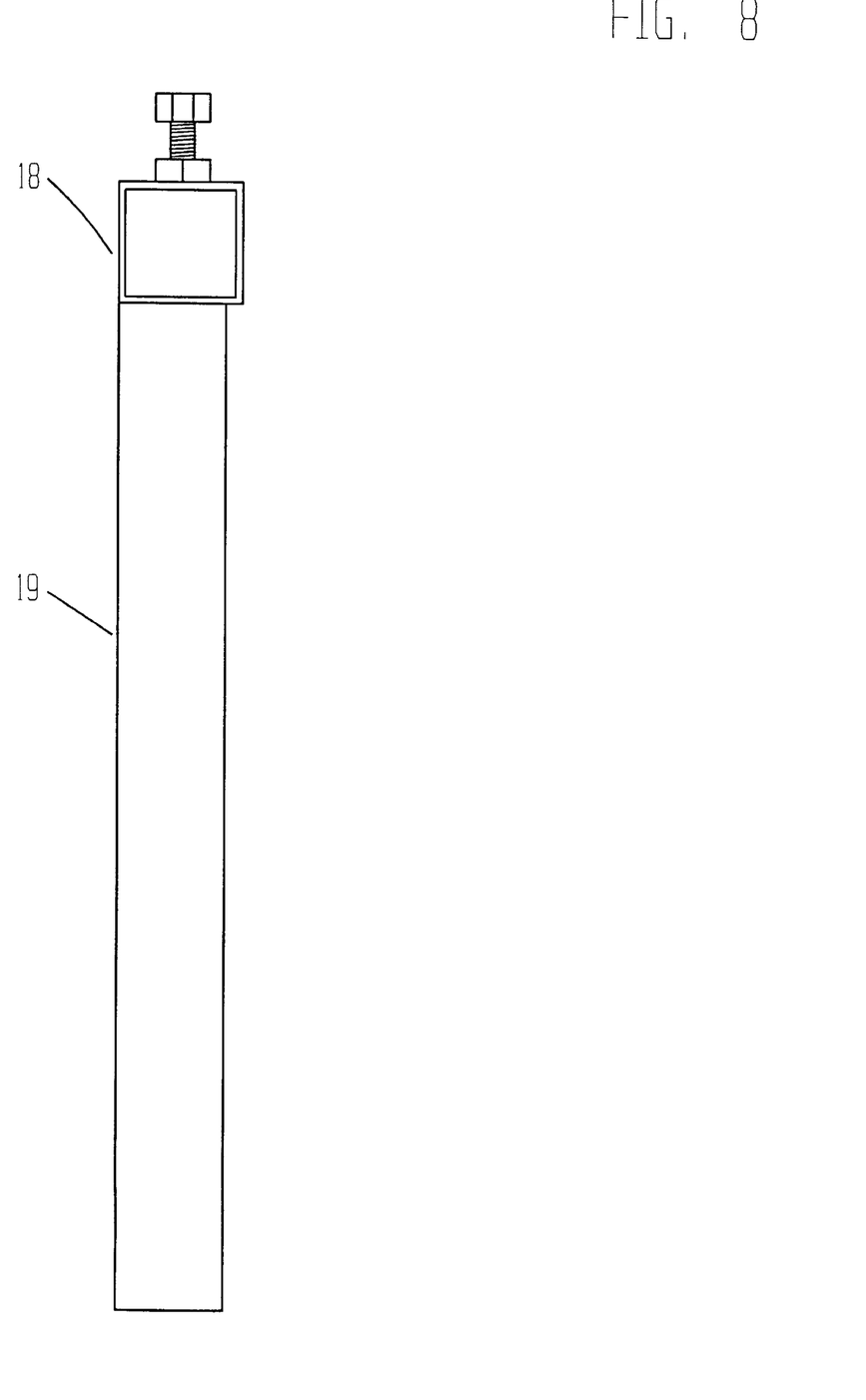
FIG. 8 is a plane view of items 18 and 19.

FIG. 8 illustrates the construction of Items 18 & 19 which are welded together to form the horizontal arms for the rack which can be slid along bar 17 and which have the same nut and bolt attachment means as described in FIG. 7 above.

Figure 9:
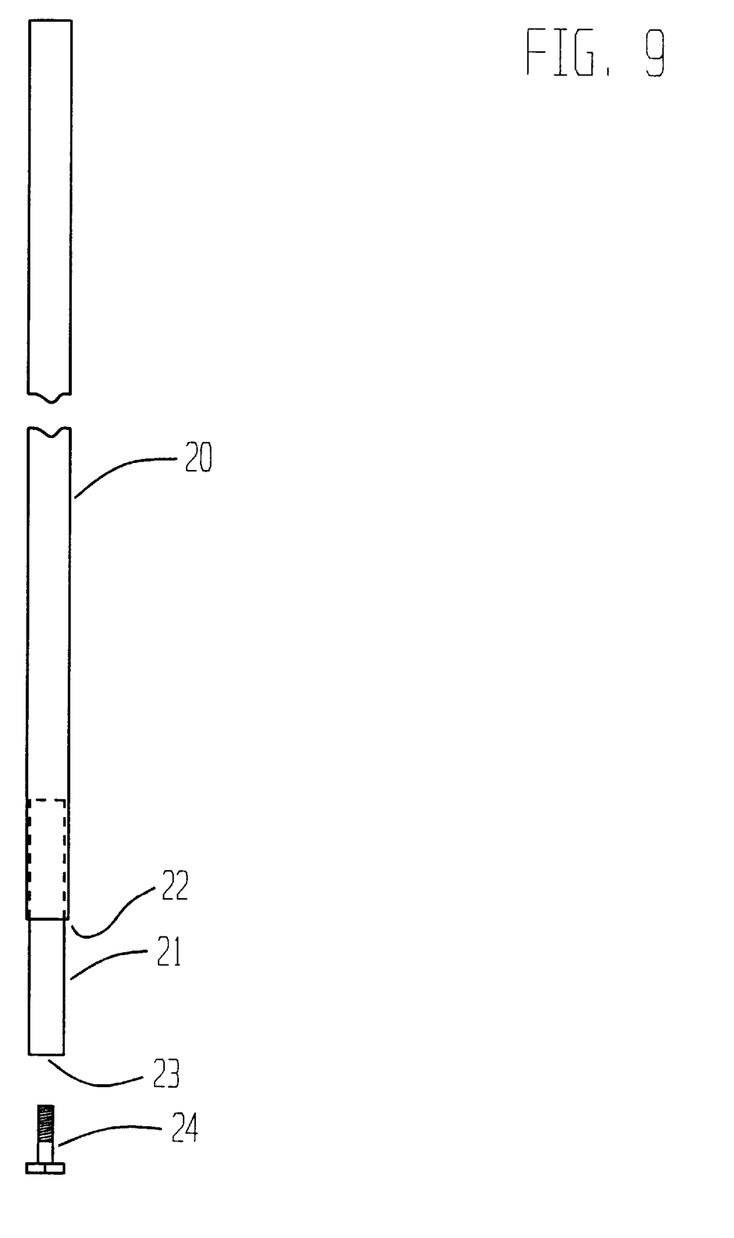
FIG. 9 is a plane view of Items No. 20 & 21.

FIG. 9 illustrates the construction of Item 20. By welding tubes 20 & 21 together, a shoulder 22 is created. A threaded nut is welded to the lower end of tube 21 and tube 21 is just slightly shorter than tube 15. When tube 21 is inserted into tube 15, bolt 24 may be introduced through hole 14 and screwed into nut 23, firmly pulling shoulder 22 against the upper edge of tube 15. This creates a rigid connection which eliminates wobble between these two parts.

Figure 10:
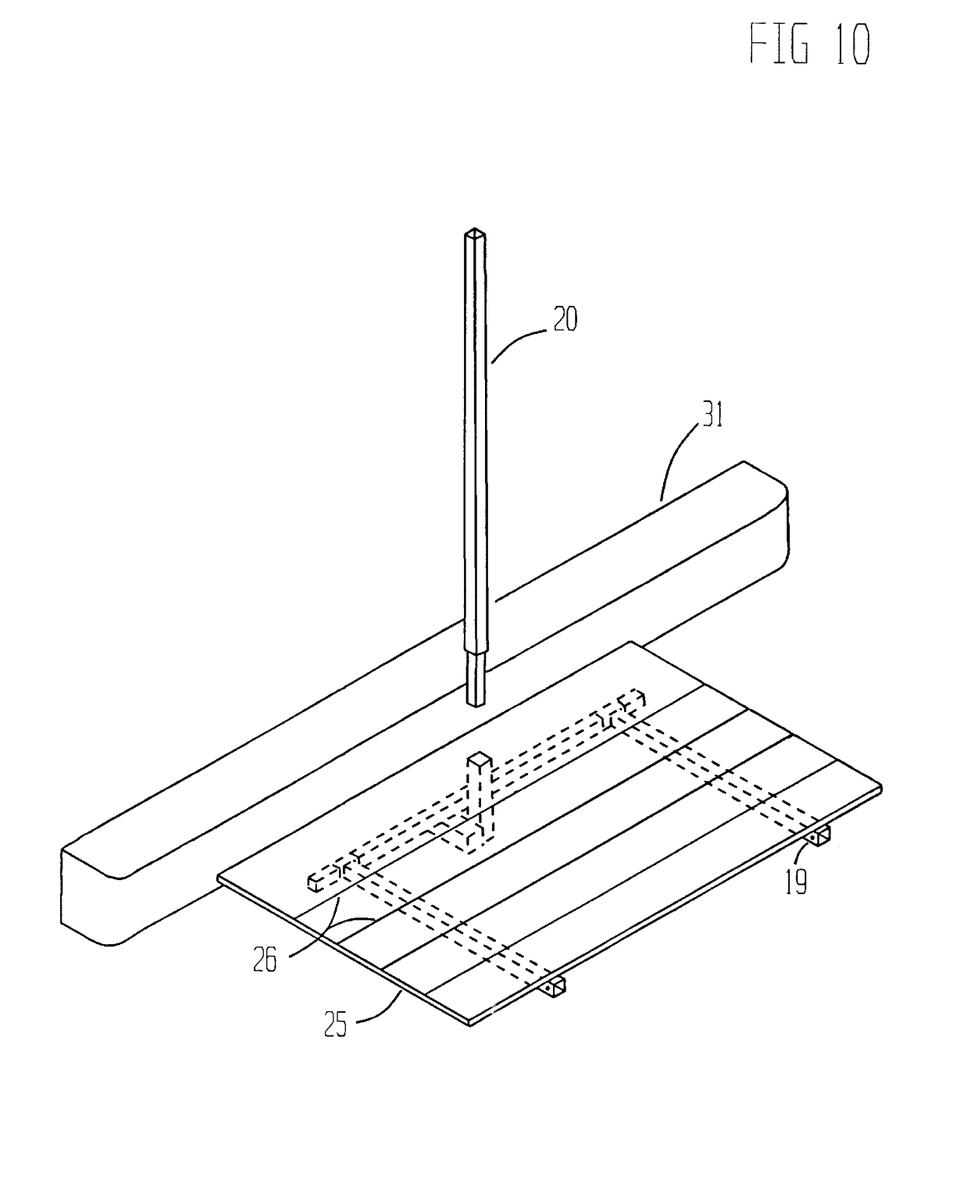
FIG. 10 is a partially exploded isometric view of the rack with a platform attached to serve as a base for hauling large items.
Figure 11:
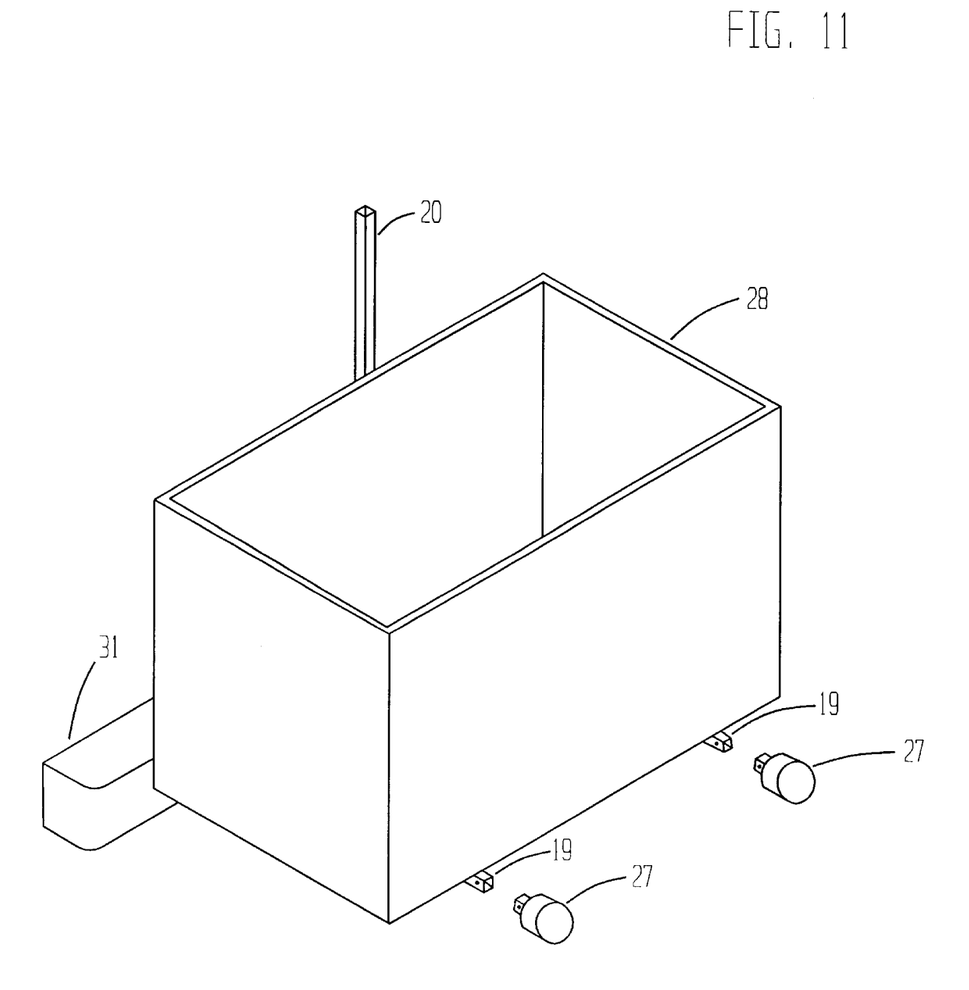
FIG. 11 is an isometric view of the rack with an open cargo container resting on tubes 17 & 19.

FIG. 10 illustrates how a folding platform, Item 25 can be placed on the supporting bars 17 & 19. Lines 26 represent hinge lines of the folding platform 25.

FIG. 11 illustrates how a supplemental cargo container, Item 28, can be placed in supporting bars 17 & 19. Such a cargo container can be either open, as illustrated, or closed. This would allow up to 25 cu. ft. of extra "trunk" space for a vehicle. Supplemental lights, Items 27, can be easily attached to the ends of bars 19 if the cargo container, or other load obstructs the tail lights of the vehicle.

Figure 12:
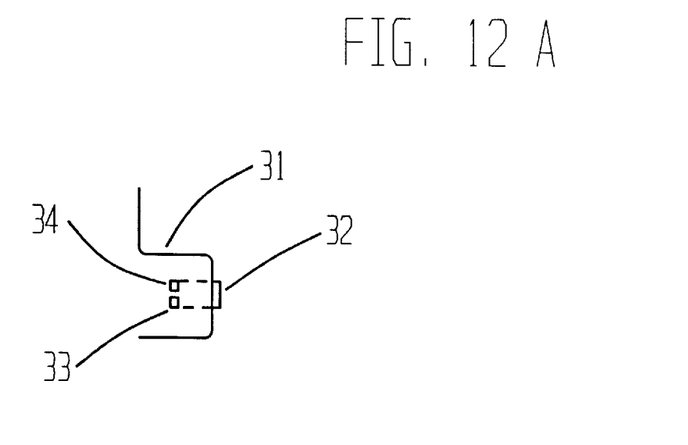

FIGS. 12a & b illustrate alternate methods of attaching the rack to a vehicle, especially if the vehicle manufacturer incorporated the attachment means at the time of construction of the vehicle. In FIG. 12a, Item 32 is, in essence, a receiver-type trailer hitch built into the bumper, with Item 33 being a solid block at the proximal end of the receiver with a threaded opening, Item 34, for the receipt of bolt 9. Item 32 is shown extending from the bumper, however it could also be flush with the rear surface of the bumper. FIG. 12b illustrates how the attachment point for this rack could be built into a bumper utilizing a vertical tube, Item 35, similar to tube 15 in FIG. 3. Either of these attachment means would allow the use of more than one attachment point as illustrated in FIG. 6. Such a design adds stability and strength to the rack not possible by using a single attachment point. It would also allow the manufacturer to custom design the add-on cargo container to better blend in with the vehicle, both aesthetically and aerodynamically. This would allow for a major reduction in the size of conventional vehicle trunks, thereby reducing weight and increasing gas mileage.

The modular carrying rack presents several improvements over the existing art. Utilizing readily available materials which require only simple manufacturing techniques, the rack will be inexpensive. Being tubular and modular, it is light weight and easy to assemble utilizing wing nuts and wing-head bolts, it can be assembled with only a minimum of toots. Since the rack can easily be disassembled into individual lengths of tubing, it can be easily stored in the vehicle trunk. With the mounting assembly (FIG. 3) in place, the rack is easy to attach to the vehicle. Since objects will be carried at the rear of the vehicle, they will present less wind resistance and interfere less with the aerodynamics of the vehicle. Since objects will be carried lower to the ground, they will be easier and safer to load and unload than with conventional roof racks. On most vehicles, the trunk can still be accessed even while the rack and its load are in place. With appropriate engineering, the rack will allow loads of up to three hundred pounds to be carried at the back of the vehicle on a platform of approximately 24"×48"—this will allow a wide variety of household items to be transported: desks, dressers, tables, chairs, and even many appliances. Using a supplemental cargo container, the vehicle could have up to 25 cu. ft. of additional cargo space.

Although preferred embodiments of the rack of the present invention have been illustrated and described, it is to be understood that the present disclosure is made by way of example and that various other embodiments are possible without departing from the subject matter coming within the scope of the following claims, which subject matter is regarded as the invention.

The embodiments of the invention in which an exclusive property or privilege is claimed are defined as follows:

1. A modular, multipurpose carrying rack attachable to a vehicle for transporting items, said rack comprising:

at least one first vertical member having a lower end and an upper end, said lower end having means for removably attaching said lower end to an end of a vehicle;

at least one cross bar extending substantially transversely of said at least one first vertical member having a first slide means for slidably attaching said at least one cross bar to said at least one first vertical member, said first slide means including an attachment means for attaching said first slide means at multiple points along the length of said at least one first vertical member;

at least two elongate members, each said at least two elongate members with a second slide means for slidably attaching each said at least two elongate members to said at least one cross bar, said second slide means including an attachment means for firmly attaching said at least two elongate members at multiple points along the length of said cross bar; and a platform having a proximal side and a distal side, said proximal side having an opening therein, said opening sized to slidably fit over said first vertical member and wherein said at least one first vertical member, said at least one cross bar, said at least two elongate members, and said platform are rearrangable to form different rack configurations.

2. The modular, multipurpose carrying rack of claim 1 wherein the means for removably attaching said lower end to the end of the vehicle includes a connector for connecting said lower end to a receiver-type trailer hitch, said connector comprising:

a first insertable member sized and shaped to fit within an opening of the receiver of said receiver-type trailer hitch, said first insertable member including an aperture therethrough for alignment with an aperture through said receiver for receipt of a securing means to secure said first insertable member to said receiver and a threaded aperture for receipt of a bolt;

a second insertable member sized and shaped to fit within said opening of said receiver, said second insertable member including a collar about its circumference, said collar having at least one angled face to abut the opening of said receiver and a shoulder at the distal end of said second insertable member, said shoulder having an aperture for insertion of said bolt, said bolt to be inserted through said aperture into said threaded aperture of said first insertable member; when said bolt is tightened, said collar of said second insertable member is forcible abutted to said opening of said receiver, thereby limiting movement between said receiver and said second insertable member; and an attachment means for attaching said carrying rack to said second insertable member.

3. The modular, multipurpose carrying rack of claim 2 wherein the attachment means for attaching said carrying rack to said second insertable member comprises a second vertical member for slidable receiving said first vertical member and an attachment means for removably attaching said first vertical member securely to said second vertical member.

4. The modular, multipurpose carrying rack of claim 1 wherein said platform further comprises at least two sections, said sections being joined by a hinge.

* * * * *